United States Patent
Jin et al.

(10) Patent No.: US 12,331,799 B2
(45) Date of Patent: Jun. 17, 2025

(54) METHOD OF PREDICTING VEHICLE CLUTCH LIFE BASED ON REAL-TIME JUDDER DIAGNOSIS AND SYSTEM FOR DIAGNOSING VEHICLE JUDDER IN REAL TIME

(71) Applicants: Hyundai Motor Company, Seoul (KR); Kia Corporation, Seoul (KR)

(72) Inventors: Jae-Min Jin, Seoul (KR); In-Soo Jung, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 284 days.

(21) Appl. No.: 18/178,740

(22) Filed: Mar. 6, 2023

(65) Prior Publication Data

US 2024/0052896 A1 Feb. 15, 2024

(30) Foreign Application Priority Data

Aug. 10, 2022 (KR) .......................... 10-2022-0099859

(51) Int. Cl.
*F16D 48/06* (2006.01)

(52) U.S. Cl.
CPC .... *F16D 48/06* (2013.01); *F16D 2500/10412* (2013.01); *F16D 2500/30406* (2013.01); *F16D 2500/31* (2013.01)

(58) Field of Classification Search
CPC ........... F16D 48/06; F16D 2500/10412; F16D 2500/30406; F16D 2500/31
See application file for complete search history.

(56) References Cited

U.S. PATENT DOCUMENTS

| | | | |
|---|---|---|---|
| 5,531,308 A * | 7/1996 | Gochenour | F16D 13/70 116/284 |
| 7,299,120 B2 | 11/2007 | Serebrennikov | |
| 2003/0106759 A1* | 6/2003 | Sakai | F16D 27/115 192/70.14 |
| 2005/0189192 A1 | 9/2005 | Serebrennikov | |
| 2005/0211524 A1* | 9/2005 | DeVore | F16D 48/06 192/30 W |
| 2010/0023202 A1* | 1/2010 | Schoeggl | G01M 17/007 701/31.4 |
| 2010/0108461 A1* | 5/2010 | Bitzer | F16D 48/06 192/30 W |

(Continued)

FOREIGN PATENT DOCUMENTS

WO 2004027285 A1 4/2004

*Primary Examiner* — Keith D Bloomquist
(74) *Attorney, Agent, or Firm* — Slater Matsil, LLP

(57) ABSTRACT

An embodiment method of predicting vehicle clutch life based on real-time judder diagnosis includes storing to a cloud server actual road driving data measured by an actual road driving information collection device while a vehicle travels, extracting a judder occurrence entry condition by downloading the actual road driving data from the cloud server and checking judder occurrence information in a clutch life prediction device, calculating a judder index by checking judder index information from the actual road driving data in the clutch life prediction device, predicting a clutch useful life of a double clutch transmission (DCT) using a clutch useful life prediction curve for the judder index, and generating a maintenance notification at a time of clutch maintenance.

17 Claims, 5 Drawing Sheets

(56) References Cited

U.S. PATENT DOCUMENTS

| | | | |
|---|---|---|---|
| 2010/0126821 A1* | 5/2010 | Adams | F16D 13/757 |
| | | | 192/66.1 |
| 2010/0200357 A1* | 8/2010 | Okabe | F16D 48/066 |
| | | | 192/30 W |
| 2018/0029601 A1* | 2/2018 | Göppert | B60W 10/06 |
| 2021/0125420 A1* | 4/2021 | Tabata | G07C 5/006 |
| 2021/0192860 A1* | 6/2021 | Kale | G06N 3/049 |
| 2021/0239142 A1* | 8/2021 | Malloy | F16D 48/06 |
| 2022/0111837 A1* | 4/2022 | Yeom | B60W 60/00186 |
| 2022/0163426 A1* | 5/2022 | Hou | G01M 13/045 |
| 2022/0316588 A1* | 10/2022 | Iida | F16H 57/01 |

* cited by examiner

METHOD OF PREDICTING VEHICLE CLUTCH LIFE BASED ON REAL-TIME JUDDER DIAGNOSIS AND SYSTEM FOR DIAGNOSING VEHICLE JUDDER IN REAL TIME

CROSS-REFERENCE TO RELATED APPLICATIONS

This application claims the benefit of Korean Patent Application No. 10-2022-0099859, filed on Aug. 10, 2022, which application is hereby incorporated herein by reference.

TECHNICAL FIELD

Exemplary embodiments of the present disclosure relate to vehicle clutch life prediction.

BACKGROUND

In general, vehicle vibration is caused by a judder phenomenon that is caused by a change in clutch rotational speed (i.e., revolutions per minute) of a transmission depending on the change in driving state, but is not always proportional to the magnitude of the change in clutch rotational speed (i.e., revolutions per minute).

For example, the judder phenomenon is caused by geometry judder or friction judder. The geometry judder is caused by the geometrical deviation of a clutch system rotation mechanism and has characteristics of a variable frequency of occurrence and a relatively long duration of occurrence compared to the friction judder. The friction judder is caused by the contamination of clutch friction material or the change in friction characteristics after durability and has characteristics of a fixed frequency of occurrence and a relatively short duration of occurrence compared to the geometry judder.

Among the transmissions, a double clutch transmission (DCT) uses two clutches to perform automatic shifting through operating clutch switching. Accordingly, the DCT has an advantage of providing the convenience of an automatic transmission even though the DCT itself is a manual transmission.

Since shifting is performed by two clutches in a DCT vehicle, a judder phenomenon, which causes vehicle vibration when a driving state, including starting, is changed, may occur more significantly.

For this reason, judder diagnostic software (or logic) is required to accurately identify the judder phenomenon. The judder diagnostic software (or logic) makes it possible to solve the cause of the judder phenomenon in advance by identifying the vibration generated during driving of the DCT vehicle to be tested for the judder phenomenon. In this case, the judder diagnostic software (or logic) may be run by a global diagnostic system (GDS), which is mobile or tablet PC-based diagnostic equipment.

This allows the DCT vehicle to maintain vehicle marketability through proactive judder diagnosis even in the recent trend of increasing the mounting rate of the DCT in the vehicle.

However, the judder diagnostic software (or logic) is an indirect diagnostic means for attaching a vibration sensor (or acceleration sensor) of a tablet PC to an arbitrary position in the vehicle and using a vibration sensor value (or acceleration sensor value) detected by the vibration sensor (or acceleration sensor) as input data for a judder evaluation mode.

Hence, the driver of a vehicle detects any vehicle abnormality caused by the vibration generated in real time while the vehicle travels. In a situation in which the vehicle anomaly is detected, the driver visits a service center or repair shop with his/her own subjective judgment to evaluate the level of judder occurrence of the vehicle, thereby determining the judder evaluation of the vehicle for the need to change the clutch thereof.

The method that does not diagnose judder occurrence in real time while the vehicle travels on the actual road may face the following issues because the method makes it impossible for the driver who uses a rental vehicle or a shared vehicle with the concept of sharing and subscription to grasp the problem history of the vehicle caused by the judder phenomenon in the vehicle before driving the vehicle.

For example, in the case of a rental vehicle or a shared vehicle, firstly, even if a vehicle abnormality occurs due to an increase in the mileage of the vehicle at the time of use by the driver, the driver facing the situation endures all the inconvenience. Secondly, the clutch durability further deteriorates as the time of vehicle arrival at the service center or repair shop varies due to the difference in subjective level evaluation for each driver because the driver does not grasp the problem history of the vehicle while driving the vehicle. Thirdly, due to the sensitive criteria of the driver, the time and cost for judder evaluation increase by putting the vehicle into the service center or repair shop even though the level of judder occurrence is not large. Fourthly, due to the driver's indifference, the vehicle is left as it is even though the level of judder occurrence is serious, which leads to a major problem, such as clutch replacement, from an initial minor judder problem.

Considering the recent trend of changing to shared vehicles with the concept of sharing and subscription, instead of monitoring the judder occurrence in the vehicle that has depended on the driver's subjectivity, which may occur according to the most common change in the concept of vehicle ownership of an individual, enhancement of the function of maintenance that does not depend on the driver is required.

SUMMARY

Exemplary embodiments of the present disclosure relate to vehicle clutch life prediction. Particular embodiments relate to a system for diagnosing vehicle judder in real time in which the level of judder occurrence identified through vehicle judder diagnosis based on actual road vehicle driving data is applied to clutch life prediction.

An embodiment of the present disclosure is directed to a method of predicting vehicle clutch life based on real-time judder diagnosis and a system for diagnosing vehicle judder in real time, in which the level of judder occurrence is identified with actual road data measured and stored by monitoring a driving vehicle in real time, thereby solving endurance of inconvenience of the driver of the vehicle, not the owner of the vehicle, together with the exclusion of a vehicle driver's inappropriate intervention in determining the abnormality of all vehicles, including rental vehicles and shared vehicles. Particularly, the method and system are capable of predicting a clutch useful life by objectively determining the level of judder occurrence using an index value calculated under the driving condition extracted from road driving data of the vehicle. Therefore, it is possible to reduce vehicle maintenance costs by identifying the time of easy and accurate clutch maintenance.

Other objects and advantages of embodiments of the present disclosure can be understood by the following description, and become apparent with reference to the embodiments of the present disclosure. Also, it is obvious to those skilled in the art to which the present disclosure pertains that the objects and advantages of embodiments of the present disclosure can be realized by the means as claimed and combinations thereof.

In accordance with an embodiment of the present disclosure, there is provided a method of predicting vehicle clutch life based on real-time judder diagnosis, which includes storing, to a cloud server, actual road driving data measured by an actual road driving information collection device while a vehicle travels, extracting a judder occurrence entry condition by downloading the actual road driving data from the cloud server and checking judder occurrence information in a clutch life prediction device, calculating a judder index by checking judder index information from the actual road driving data in the clutch life prediction device, predicting a clutch useful life of a double clutch transmission (DCT) using a clutch useful life prediction curve for the judder index, and generating a maintenance notification at a time of clutch maintenance.

A sampling frequency equal to or higher than a specific frequency may be used to measure the actual road driving data. The actual road driving data may include at least one of a vehicle speed, an accelerator pedal scope range, a mileage, a transmission gear range, a clutch rotational speed, and a clutch temperature.

The extracting a judder occurrence entry condition may include checking the judder occurrence information using at least one of a vehicle speed, an accelerator pedal scope range, a transmission gear range, a clutch rotational speed, a clutch temperature, and a mileage, applying a judder occurrence driving condition to the judder occurrence information and determining the judder occurrence driving condition as a judder occurrence condition when the judder occurrence driving condition is satisfied, and extracting a judder evaluation mode in the judder occurrence condition.

The judder occurrence driving condition may be set to at least one of a driving transmission gear range, a vehicle speed threshold, an acceleration threshold, and an accelerator pedal scope range. The driving transmission gear range may be a first gear, the vehicle speed threshold may be 0.5 km/h or more, the acceleration threshold may be 0 (zero) or more, and the accelerator pedal scope range may be 0 to 40% APS.

The calculating a judder index may include checking the judder index information using at least one of a clutch rotational speed, a clutch temperature, and a mileage, signal-processing the clutch rotational speed through a bandpass filter and calculating the number of peaks using minimum and maximum values of the clutch rotational speed at the clutch temperature, checking a judder index generation condition with the number of peaks, and calculating the judder index in the judder index generation condition.

The number of peaks may use a specific number. The judder index may include a clutch temperature index set from a relationship between a clutch index of the DCT and a maximum value of longitudinal vibration of the vehicle.

The predicting a clutch useful life may include averaging the judder index by setting, as a moving average, an average of a previous mileage of last measured data with respect to the mileage, calculating the clutch useful life by data plotting of the judder index with a change in mileage to the moving average and calculating the clutch useful life prediction curve using a curve fitting function, and checking a clutch limit life by applying a life reference point to the clutch useful life prediction curve.

The previous mileage may be set to a specific distance. The clutch limit life may be checked when the clutch useful life prediction curve deviates from the life reference point.

The generating a maintenance notification may include generating a primary maintenance notification by setting, as the time of clutch maintenance, a time when the clutch useful life prediction curve deviates from a life reference point, checking an elapse of notification time using a tolerance time, and generating a secondary maintenance notification.

The maintenance notification may use a primary message and a secondary message to display an external message in different contents.

The tolerance time may be set in a section close to a limit life in which the clutch useful life prediction curve deviates from the life reference point.

In accordance with another embodiment of the present disclosure, there is provided a system for diagnosing vehicle judder in real time, which includes an actual road driving information collection device configured to measure actual road driving data while a vehicle travels, a cloud server configured to store the actual road driving data, a clutch life prediction device configured to extract a judder evaluation mode using at least one of a vehicle speed, an acceleration, an accelerator pedal scope range, a mileage, a transmission gear range, a clutch rotational speed, and a clutch temperature of the actual road driving data, to calculate a judder index using at least one of the clutch rotational speed, the clutch temperature, and the mileage, and to predict a clutch useful life of a double clutch transmission (DCT) using a useful life prediction curve calculated by a curve fitting function after data plotting of the judder index with a change in mileage, and a notification unit configured to generate a maintenance notification at a time of clutch maintenance checked as a result of prediction of the clutch useful life.

The actual road driving information collection device may include a transmission controller configured to detect at least one of the transmission gear range, the clutch rotational speed, and the clutch temperature in the vehicle, and a vehicle and driver management system (VDMS) mounted on the vehicle and linked to the transmission controller and the cloud server while detecting at least one of the vehicle speed, the acceleration, the accelerator pedal scope range, and the mileage in the vehicle.

The clutch life prediction device may include a judder evaluation condition extractor configured to download the actual road driving data from the cloud server, and a judder index calculator configured to extract the judder evaluation mode, calculate the judder index, calculate the useful life prediction curve, predict the clutch useful life, and generate the time of clutch maintenance.

The notification unit may display "maintenance notification" and "warning, maintenance reminder" as external display characters in a driver's seat cluster of the vehicle.

DETAILED DESCRIPTION OF ILLUSTRATIVE EMBODIMENTS

Exemplary embodiments of the present disclosure will be described below in more detail with reference to the accompanying drawings. The present disclosure may, however, be embodied in different forms and should not be construed as limited to the embodiments set forth herein.

Figure 1:
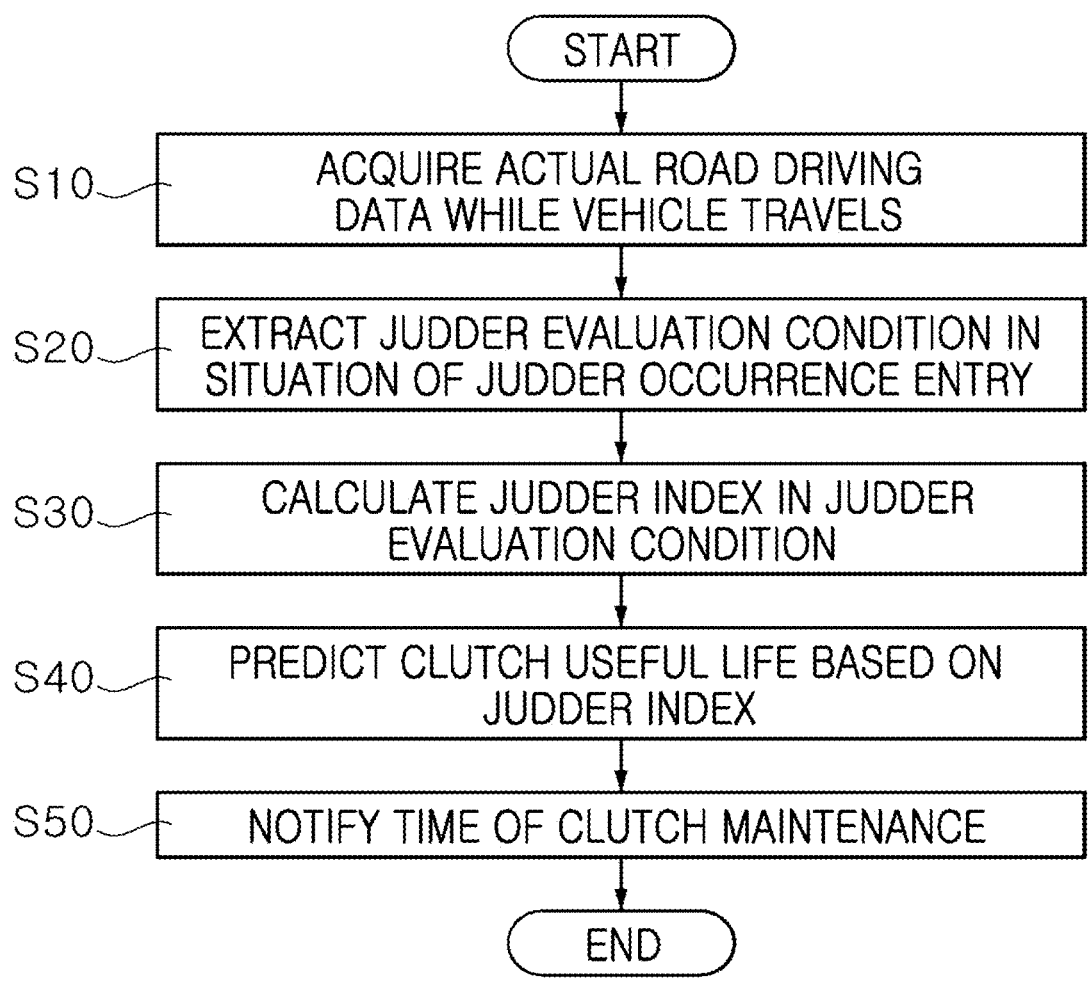
FIG. 1 is a schematic flowchart illustrating a method of predicting vehicle clutch life based on real-time judder diagnosis according to embodiments of the present disclosure.

Referring to FIG. 1, a method of predicting clutch life includes a step of acquiring actual road driving data while a vehicle travels (S10), a step of extracting a judder occurrence entry condition through judder occurrence information of actual road driving data (S20), a step of calculating a judder index through judder index information of actual road driving data in a judder evaluation mode (S30), a step of predicting clutch useful life based on the judder index (S40), and a step of notifying a time of clutch maintenance (S50). In this case, the clutch includes a double clutch of a double clutch transmission (DCT).

In the step of acquiring vehicle driving data (S10), the vehicle driving data is information uploaded and stored in a cloud storage and is actual road driving data obtained by measuring a sampling frequency, which is equal to or higher than a specific frequency (e.g., 100 Hz), through real-time monitoring while the vehicle travels.

Accordingly, the method is characterized as a method of predicting vehicle clutch life based on real-time judder diagnosis, which measures a change in mileage by analyzing/classifying, through a frequency filter, waveforms of the rotational speed (i.e., revolutions per minute) measured when judder occurs in a DCT vehicle, thereby notifying a driver of the measured result together with clutch life diagnosis using a curve fitting function.

Figure 2:
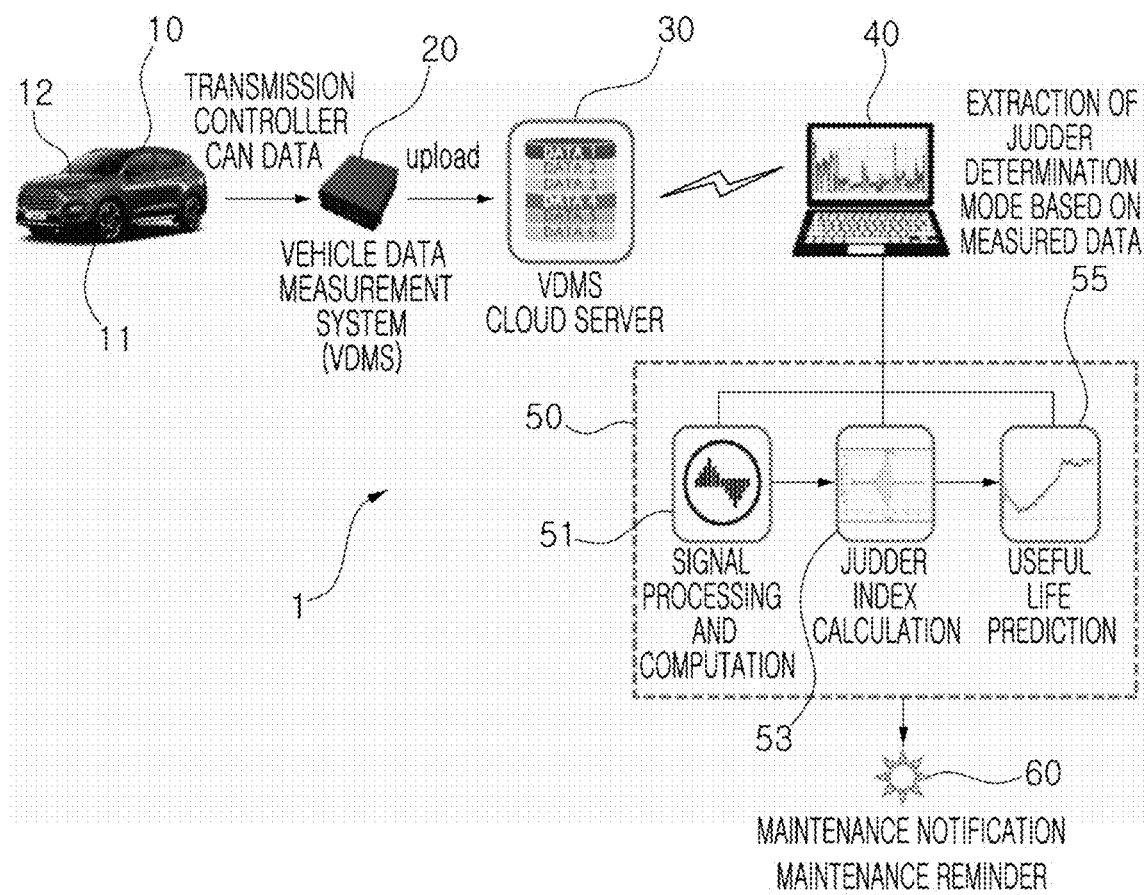
FIG. 2 is an example of a system for diagnosing vehicle judder in real time, which is applied to a vehicle in which clutch life prediction based on real-time judder diagnosis is made using actual road data according to embodiments of the present disclosure.

Referring to FIG. 2, a system 1 for diagnosing vehicle judder in real time includes an actual road driving information collection device 12/20, a cloud server 30, a clutch life prediction device 40/50, and a notification unit 60.

The actual road driving data includes transmission information and vehicle sensor information. The transmission information includes a transmission gear range, a clutch rotational speed, and a clutch temperature, and the vehicle sensor information includes a vehicle speed, an accelerator pedal scope range, and a mileage.

Specifically, the actual road driving information collection device 12/20 includes a transmission controller 12 and a vehicle data management system (VDMS) 20. Here, the transmission controller 12 may be a TCU.

For example, the transmission controller 12 detects transmission information generated when a DCT 11 is operated. In this case, the DCT 11 is a manual transmission that performs automatic shifting through switching of two clutches (i.e., double clutch) to provide the convenience of an automatic transmission.

For example, the VDMS 20 receives vehicle sensor information detected by an onboard sensor, which is a basic sensor mounted on a vehicle 10, together with transmission information of the transmission controller 12, through controller area network (CAN) communication, and transmits the information to the cloud server 30. The VDMS 20 automatically collects, from the onboard sensor and the controller, vehicle quick start/rapid acceleration/sudden braking, idling, economic speed, and the like according to the various driving behaviors of the driver, and performs driving index analysis, driver warning, real-time calculation of fuel efficiency/carbon dioxide emissions based on fuel consumption, and the like.

Specifically, the cloud server 30 receives and uploads information from the VDMS 20 through wireless communication and stores the information as actual road driving data of the vehicle 10. In this case, the actual road driving data includes transmission information and vehicle sensor information.

Specifically, the clutch life prediction device 40/50 includes a judder evaluation condition extractor 40 and a judder index calculator 50. The judder evaluation condition extractor 40 and the judder index calculator 50 may be mounted on the vehicle 10 and integrated with the VDMS 20.

For example, the judder evaluation condition extractor 40 receives actual road driving data from the cloud server 30 through wireless communication to extract a judder determination mode that is meaningful for judder analysis. The judder index calculator 50 is linked with the judder evaluation condition extractor 40 in the extracted judder determination mode so that a signal processing unit 51 is used to process and calculate signals, a judder index calculation unit 53 is used to calculate a judder index, and a clutch life prediction unit 55 is used to predict a clutch useful life.

Therefore, the judder evaluation condition extractor 40 includes the signal processing unit 51, the judder index calculation unit 53, and the clutch life prediction unit 55 as internal components, and the judder index calculator 50 may thus be integrated with the judder evaluation condition extractor 40 without being configured as a separate device.

Specifically, the notification unit 60 notifies the driver of the result of clutch useful life prediction from the clutch life prediction unit 55 in the form "maintenance notification" and "maintenance reminder" in the driver's seat cluster of the vehicle 10. To this end, the notification unit 60 includes a lighting lamp and a character display window.

As such, the system 1 for diagnosing vehicle judder in real time includes the VDMS 20 mounted on the vehicle to store and transmit CAN signals used by vehicle controllers (e.g., the transmission controller 12), extracts a mode that is meaningful for judder analysis by linking the judder evaluation condition extractor 40 and/or the judder index calculator 50 to the cloud server 30 that stores actual road driving data measured while the vehicle 10 travels, diagnoses a clutch state while monitoring a change in the judder index calculated for judder occurrence monitoring in the extracted judder determination mode according to the increase in the mileage (i.e., driving distance) of the vehicle 10, and predicts a clutch useful life based on the size and frequency of the judder index.

Figure 3:
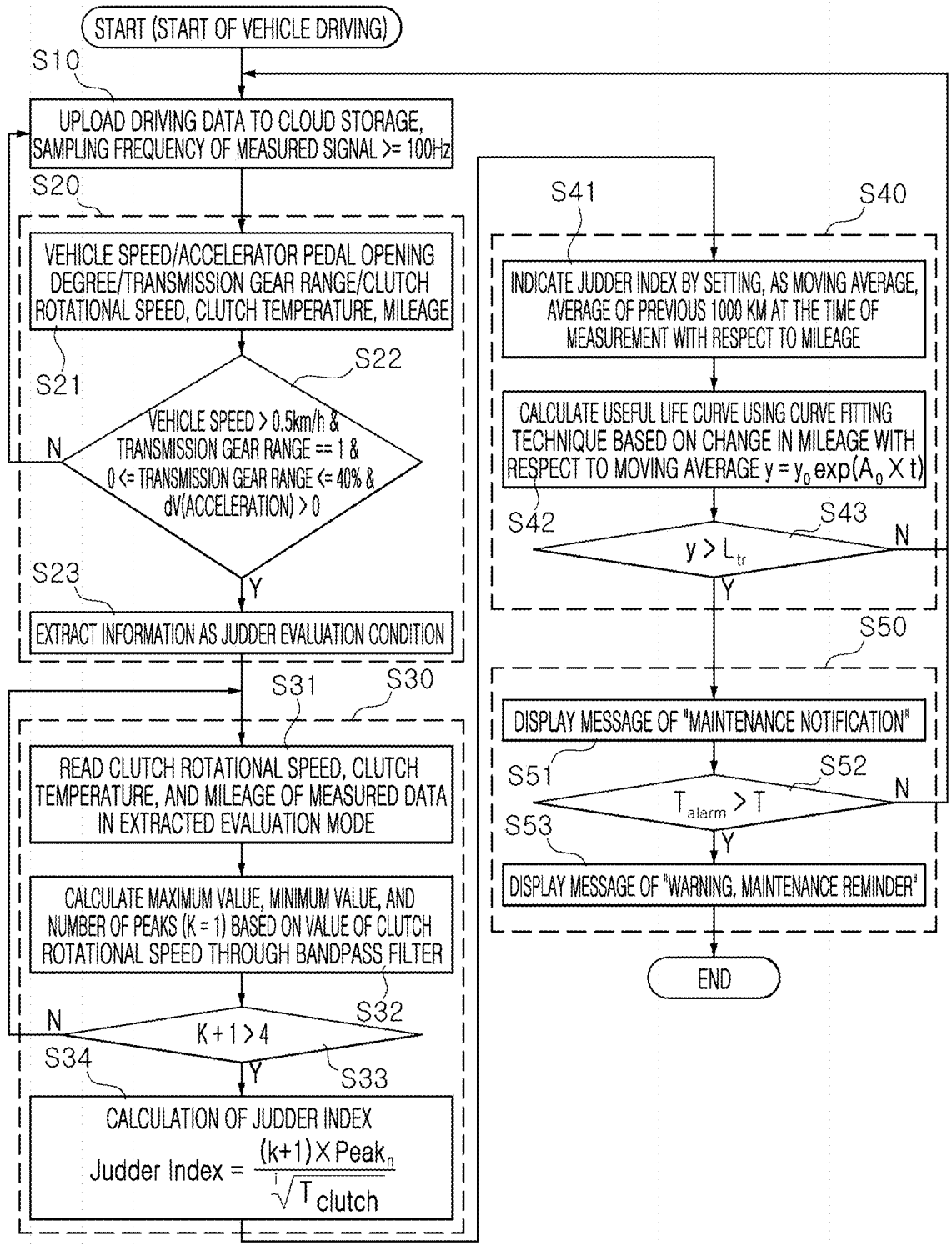
FIG. 3 is a detailed flowchart illustrating the method of predicting vehicle clutch life based on real-time judder diagnosis according to embodiments of the present disclosure.

FIG. 3 is a detailed flowchart of the method of predicting vehicle clutch life based on real-time judder diagnosis, which will be described in detail with reference to FIGS. 4 to 6 together with FIG. 2. Here, the control subject is the actual road driving information collection device 12/20 and the clutch life prediction device 40/50, and the control target is the clutch of the DCT 11.

First, the VDMS 20 performs the step of acquiring vehicle driving data (S10). Here, the actual road driving data is real-time monitoring data until the vehicle mileage reaches a specific distance (e.g., 1,000,000 km). In such data, a frequency equal to or higher than a specific frequency is set to a sampling frequency and acquired. In this case, the actual road driving data is acquired until the vehicle mileage (i.e., driving distance) reaches a maximum specific distance. The reason for this is that the clutch durability life of the DCT 11 is set to a specific distance, so the numerical value thereof may be set below or above a specific distance.

Referring to FIG. 2, the VDMS 20 acquires, as vehicle sensor information, a vehicle speed, an accelerator pedal scope range, and a mileage through its own function, as well as, as transmission information, a transmission gear range, a clutch rotational speed, and a clutch temperature from the transmission controller 12, and transmits the vehicle sensor information and the transmission information as actual road driving data to the cloud server 30. In this case, since the communication between the VDMS 20 and the cloud server 30 is performed in real time while the vehicle travels, the actual road driving data measured by the VDMS 20 may be extracted as a result of clutch life prediction in real time.

Then, the judder evaluation condition extractor 40 extracts a judder evaluation condition from the situation of judder occurrence entry in the step of extracting a judder occurrence entry condition (S20). This allows a judder evaluation mode to be extracted in a step of checking judder occurrence information of the actual road driving data (S21), in a step of determining a judder evaluation condition through the judder occurrence information (S22), and in a step of judder evaluation condition (S23).

Referring to FIG. 2, the judder evaluation condition extractor 40 downloads judder occurrence information of the actual road driving data from the cloud server 30 that stores the actual road driving data measured by the VDMS 20. In this case, the communication between the judder evaluation condition extractor 40 and the cloud server 30 is performed in real time while the vehicle travels, and the actual road driving data includes transmission information and vehicle sensor information.

For example, in the step of checking judder occurrence information (S21), the transmission information and vehicle sensor information of the actual road driving data are used as judder occurrence information, which includes a vehicle speed, an accelerator pedal scope range, a transmission gear range, a clutch rotational speed, a clutch temperature, and a mileage. Here, the mileage may be a maximum specific distance, but may be less than a specific distance at the time of data download.

For example, the step of determining a judder evaluation condition (S22) is performed through the judder occurrence entry condition to which a vehicle driving condition is applied. Here, the vehicle driving condition is set to a state in which the vehicle 10 equipped with the DCT 11 is stopped and then starts off on the general road in the first gear of the transmission. The judder occurrence entry condition is set to a threshold for the vehicle speed, the transmission gear range, the accelerator pedal scope range, and the acceleration.

Figure 4:
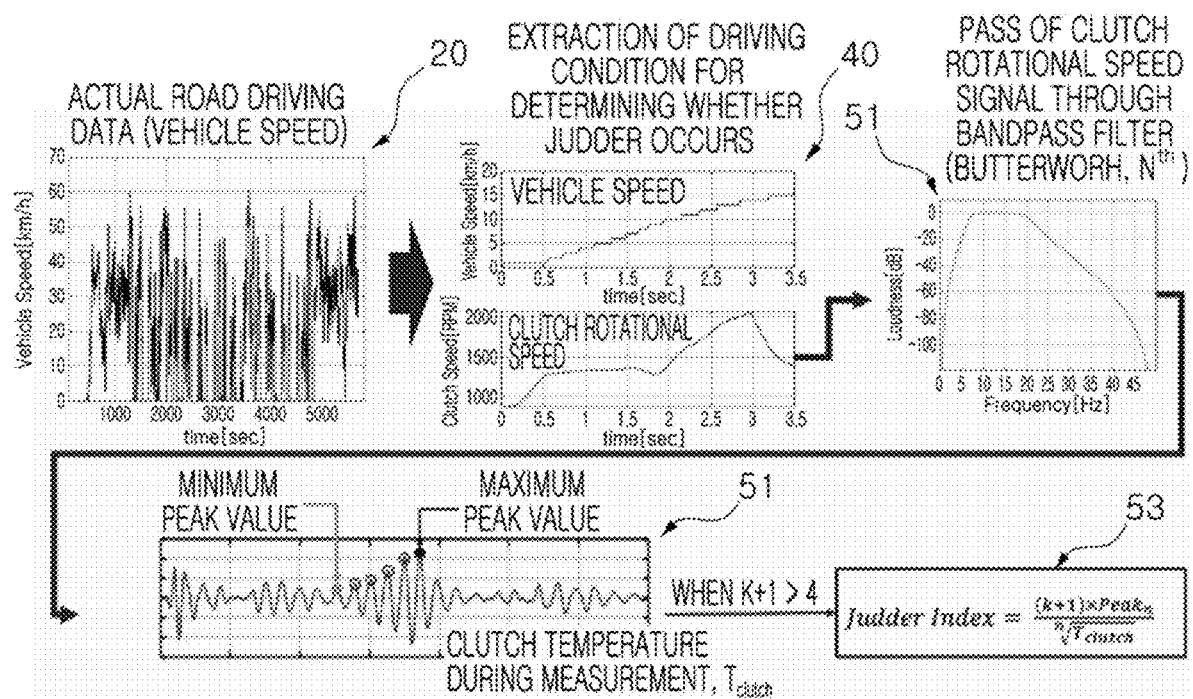
FIG. 4 illustrates data conversion in which actual road driving data is calculated as a judder index after judder evaluation condition extraction according to embodiments of the present disclosure.

Referring to FIG. 4, there is provided an example in which the vehicle speed of the judder occurrence information of the actual road driving data of the VDMS 20 is extracted by the judder evaluation condition extractor 40 as a driving condition for determining whether judder occurs.

Therefore, the judder evaluation condition extractor 40 sets the judder occurrence entry condition for judder evaluation as follows:

Judder Occurrence Entry Condition: Vehicle Speed>A? & Transmission

Gear Range=B? & Ca<Accelerator Pedal Scope Range Cb? &

Acceleration>D?, &=AND.

Here, "vehicle speed," "transmission gear range," "accelerator pedal scope range," and "acceleration" are the vehicle speed of the vehicle 10, the transmission gear range of the DCT 11, the accelerator pedal scope range by the pressing of the accelerator pedal, and the acceleration of the vehicle 10 by the operation of the accelerator pedal, as information detected in the step of acquiring vehicle driving data (S10). In addition, "A" is the vehicle speed threshold, which is set to 0.5 km/h out of about 0.3 to 0.5 km/h, "B" is set to the first gear, "Ca" is the lower limit threshold of the accelerator pedal scope range, which is set to APS (Accelerator Position Scope)=0%, "Cb" is the upper limit threshold of the accelerator pedal scope range, which is set to APS=40% out of APS=30 to 40%, and "D" is the change in vehicle speed V per time t (dV/dt), which is set to dV/dt=0.

As a result, when any one of the vehicle speed of 0.5 km/h (A) or higher, the first gear (B) of the transmission gear range, the accelerator pedal scope range between 0% and 40% (Ca to Cb) of APS, and the acceleration of 0 or more is not satisfied, the judder evaluation condition extractor 40 feeds back to the step of acquiring vehicle driving data (S10).

On the other hand, when all of the vehicle speed of 0.5 km/h (A) or higher, the first gear (B) of the transmission gear range, the accelerator pedal scope range between 0% and 40% (Ca to Cb) of APS, and the acceleration of 0 or more are satisfied, the judder evaluation condition extractor 40 extracts these types of information as judder evaluation conditions and completes the step of extracting a judder evaluation mode (S23).

Subsequently, the judder index calculator 50 performs the step of calculating a judder index in a judder evaluation mode (S30). This allows a step of checking judder index information of actual road driving data (S31), a step of processing the judder index information (S32), a step of checking a judder index generation condition (S33), and a step of calculating a judder index (S34) to be performed.

Referring to FIG. 2, the judder index calculator 50 reads, as judder index information, information on the clutch rotational speed, clutch temperature, and mileage of the actual road driving data of the VDMS 20 to check a judder index information (S31) in a judder determination mode according to the judder evaluation condition of the judder evaluation condition extractor 40.

For example, in the step of processing judder index information (S32), the clutch rotational speed is signal-processed through a bandpass filter in the extracted mode, and a minimum value is detected based on the maximum value detected from the clutch rotational speed through the filter so that the number of peaks (K+1) is calculated.

Referring to FIG. 4, the judder index calculator 50 performs the step of processing data (S32) by allowing the signal processing unit 51 to pass clutch rotational speed signals through the bandpass filter. Here, the bandpass filter is an Nth Butterworth bandpass filter or an infinite impulse response (IIR) filter where a value is selected according to the signal.

As a result, the magnitude (dB)-frequency (Hz) diagram (state before filter signal processing) for the clutch rotational speed is converted to the clutch rotational speed (revolutions per minute (RPM))-time (sec) diagram (state after filter signal processing). In this case, the clutch rotational speed-time diagram is expressed based on the clutch temperature (Tclutch) defined in the driving condition extracted from the information detected in the step of acquiring vehicle driving data (S10).

For example, in the step of checking a judder index generation condition (S33), the number of peaks (Npeak) of the clutch rotational speed is applied thereto, which is determined as a condition for generating the number of peaks:

Condition For Generating the Number of Peaks: k+1>E? where "k+1" is the number of peaks (Npeak), and "E" is the threshold for the number of peaks, which is set to 4 out of 4 to 5.

Referring to FIG. 4, the judder index calculator 50 uses the result of the signal processing unit 51 in the judder index calculation unit 53 to check the judder index generation condition (S33). The judder index calculation unit 53 defines the number of peaks (Npeak) as "n−(n−k)+1=k+1" including a maximum peak value and a minimum peak value. In this case, when the clutch rotational speed is expressed as a minimum value and a maximum value and the maximum value of the clutch rotational speed is defined as Peakn in the clutch rotational speed-time diagram, the minimum value of the clutch rotational speed is selected as a point smaller than Peak(n−k)−1 of the Peakn-kth peak values.

As a result, the judder index calculator 50 feeds back to the step of checking clutch data (S31) when the number of peaks (Npeak)(k+1) is less than a specific number (e.g., four) as the processing result of the judder index calculation unit 53. On the other hand, when the number of peaks (Npeak)(k+1) is equal to or more than a specific number (e.g., four), the judder index calculator 50 uses it to calculate a judder index (S34).

For example, in the step of calculating a judder index (S34), the judder index is determined using a judder index calculation formula.

Judder Index Formula $$\text{Judder Index} = \frac{(k+1) \times \text{Peak}_n}{\sqrt[n]{T_{clutch}}} \text{ or}$$

$$\text{Judder Index} = \frac{(k+1) \times \text{Peak}_{max}}{\sqrt[i]{T_{clutch}}}$$

Where "(k+1)" is the number of peaks (Npeak), "Peakn" and "Peakmax" are the maximum peak values, "Tclutch" is the clutch temperature, and "n" and "i" are clutch temperature indices, which are values calculated through judder evaluation for the vehicle 10 equipped with the DCT 11.

Figure 5:
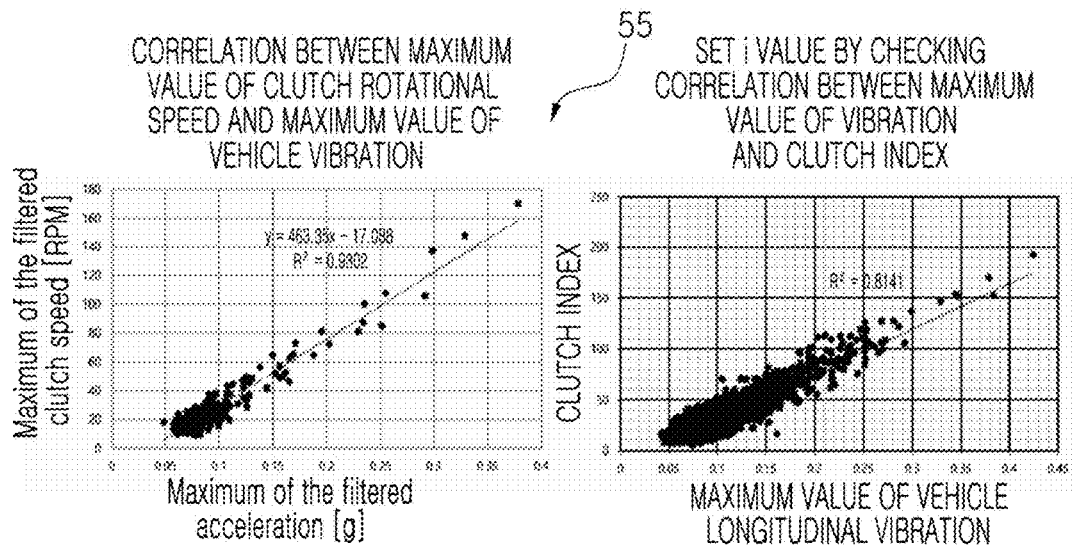
FIG. 5 is an example of correlation analysis between a judder index and a vehicle vibration value in a judder evaluation mode for the clutch index value of the judder index according to embodiments of the present disclosure.

FIG. 5 illustrates an example in which the clutch temperature index (i.e., n or i) is calculated using the clutch rotational speed-vehicle vibration diagram and the clutch index-vehicle longitudinal vibration diagram.

As illustrated in the drawing, the correlation between the maximum value of the clutch rotational speed [maximum value of the filtered clutch speed (RPM)] and the maximum value of the vehicle vibration [maximum of the filtered acceleration (g)] can be seen as y=463.35x−17.088 and R2=0.9302 in the clutch rotational speed-acceleration diagram. The correlation between the clutch index and the maximum value of the vehicle longitudinal vibration [maximum of the filtered longitudinal acceleration(g)] can be seen as R2=0.8141 in the clutch index-vehicle longitudinal vibration diagram.

This illustrates that the clutch temperature index (i.e., n or i) is set so that the R2 value of the clutch index calculated through the judder evaluation of the vehicle and the measured maximum value of longitudinal vibration of the vehicle exceeds 0.8.

Finally, the judder index calculator 50 performs a step of predicting a clutch useful life based on the judder index (S40) through a step of averaging the judder index (S41), a step of calculating a clutch useful life (S42), and a step of checking a clutch limit life (S43).

For example, in the step of averaging the judder index (S41), the judder index is indicated by setting, as a moving average, the average of the previous mileage (e.g., specific distance) at the time of measurement (i.e., based on the last measured data) with respect to the mileage. The step of calculating a clutch useful life (S42) is based on the useful life prediction curve (y) calculated based on the change in mileage (i.e., change in driving distance) with respect to the moving average.

Figure 6:
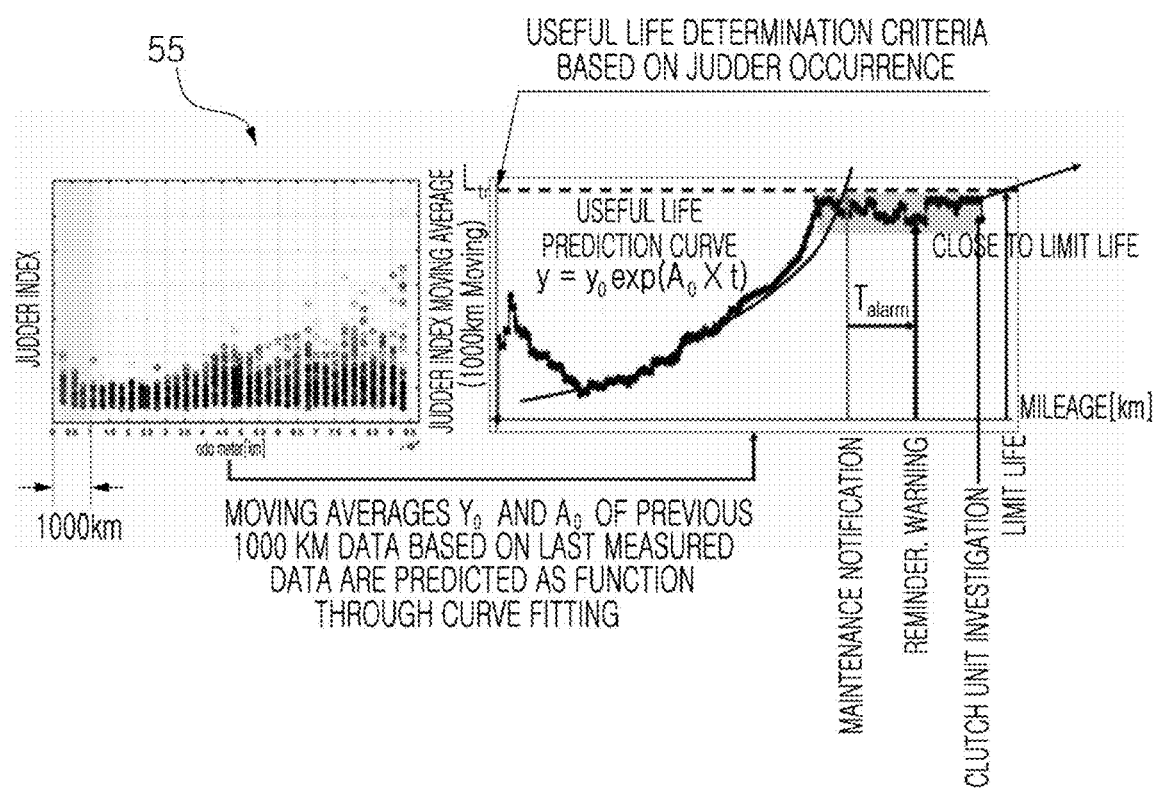
FIG. 6 is an example in which a clutch life prediction curve is calculated by data plotting the calculated judder index value with respect to the mileage of the vehicle.

Referring to FIG. 6, the judder index calculator 50 allows the clutch life prediction unit 55 to convert the judder index-odometer diagram into the judder index moving average-mileage diagram using a curve fitting technique.

For example, the judder index-odometer diagram uses the mileage under the extracted driving condition and the calculated judder index, which is performed by using a moving average up to the previous specific distance based on the judder index calculated at each specific distance.

For example, the judder index moving average-mileage diagram represents a curve by data plotting of the judder index moving average according to the change in mileage (i.e., change in driving distance). The useful life prediction curve may be derived as a function by making this curve into a curve fitting function such as y=y0 exp(A0×t) through curve fitting. In this case, the curve fitting is a mathematical method to find the curve expression y=f(x) that fits well to the point (x1, y1) when observations or measurements y1, y2, . . . are given in the discrete values of independent variables x1, x2, . . . , for example, to find an empirical formula [e.g., y=y0 exp(A0×t) of the clutch useful life prediction curve] from experimental data (e.g., actual road driving data).

In particular, the judder index moving average-mileage diagram may identify the mileage of the vehicle 10 at which the useful life prediction curve [y=y0 exp(A0×t)] of the clutch deviates from the life reference point (lifetime threshold) (Ltr), which is a useful life determination criterion based on the judder occurrence, and may grasp the state of being close to the limit life in which the clutch stays at the life reference point (Ltr) and the state of reaching the limit life deviating from the life reference point (Ltr) when the useful life prediction curve [y=y0 exp(A0×t)] becomes meaningless at the mileage of the vehicle 10. In this case, the mileage from the state of being close to the limit life to the state of reaching the limit life is set to the situation of clutch unit investigation.

Therefore, the step of checking clutch limit life (S43) may be grasped by the relationship between the clutch useful life prediction curve (y) and the life reference point (Ltr), which is determined as the clutch limit life condition:

Clutch Life Limit Condition: y>Ltr?

Accordingly, the judder index calculator 50 feeds back to the step of checking clutch data (S31) when the clutch useful life prediction curve (y) does not reach the life reference point (Ltr) from the processing result of the clutch life prediction unit 55. On the other hand, when the clutch useful life prediction curve (y) reaches the life reference point (Ltr), the process switches to a step of notifying a time of vehicle maintenance (S50).

Then, the judder index calculator 50 performs the step of notifying a time of vehicle maintenance (S50) through a step of generating a primary maintenance notification (S51), a step of checking the elapse of warning time (S52), and a step of generating a secondary maintenance notification (S53).

Referring to FIG. 6, the judder index calculator 50 checks the state of being close to the limit life in which the useful life prediction curve (y) deviates from the life reference point (Ltr) by monitoring the judder state by the clutch life prediction unit 55, and generates primary and second notifications for this result.

For example, in the step of generating a primary maintenance notification (S51), when the value exceeds a selected life reference point (Ltr) based on the useful life prediction curve (y), the message of "maintenance notification" is displayed. In the step of generating a secondary maintenance notification (S53), the message of "warning, maintenance reminder" is displayed after the time of "maintenance notification" has passed the tolerance time (T), which is a certain period of time.

Therefore, in the step of checking the elapse of warning time (S52), the primary maintenance notification and the secondary maintenance notification are distinguished by the alarm elapsed time condition:

Alarm Elapsed Time Condition: talarm>T?

where "talarm" is the elapsed time after the time of primary maintenance notification, and "T" is the tolerance time, which is set to a certain period of time within the mileage limit that does not deviate from the state of being close to the limit life.

Therefore, the tolerance time (T) allows the driver to perform clutch maintenance without exceeding the limit life of the clutch by passing a certain period of time or a mileage between the step of generating a primary maintenance notification (S51) and the step of generating a secondary maintenance notification (S53).

As described above, in the method of predicting vehicle clutch life based on real-time judder diagnosis implemented by the system 1 for diagnosing vehicle judder in real time according to embodiments of the present disclosure, the system is linked to the cloud server 30, which stores the actual road driving data measured by the actual road driving information collection device 12/20 while the vehicle 10 travels, and the clutch life prediction device 40/50. In the judder evaluation mode, which is extracted as at least one of the vehicle speed, the acceleration, the accelerator pedal scope range, the mileage, the transmission gear range, the clutch rotational speed, and the clutch temperature of the actual road driving data, the judder index calculated using at least one of the clutch rotational speed, the clutch temperature, and the mileage by the clutch life prediction device 40/50 is converted into the judder index-based useful life prediction curve (y) through the curve fitting function by data plotting with the mileage. Therefore, the waveforms of the clutch rotational speed analyzed/classified by the frequency filter when the judder occurs in the vehicle 10 may be used for diagnosis of clutch useful life of the DCT 11 and driver notification.

The method of predicting vehicle clutch life based on real-time judder diagnosis implemented by the system for diagnosing vehicle judder in real time according to embodiments of the present disclosure provides the following operations and effects.

Firstly, it is possible to objectively determine vehicle anomalies without the subjectivity of the driver by using the actual road driving data for judder diagnosis. Secondly, it is possible to predict the useful life of the clutch according to the level of judder occurrence with the index value calculated under the driving condition extracted from the road driving data of the vehicle. Thirdly, since the time of clutch maintenance and replacement is determined based on the prediction of the useful life of the clutch, it is easy to identify when maintenance is required for vehicle maintenance. Fourthly, since the time of vehicle maintenance is displayed as a maintenance notification function, the driver, not the owner of the vehicle, such as a rental vehicle or a shared vehicle, can be freed from the risk that may lead to a major accident. Fifthly, regardless of the severity of the level of judder occurrence according to the sensitivity or indifference of the driver, it is possible to resolve all chronic problems that occur in rental vehicles or shared vehicles, such as an increase in maintenance costs and neglect of maintenance due to putting the vehicle into the service center or repair shop.

While the present disclosure has been described with respect to the specific embodiments, it will be apparent to those skilled in the art that various changes and modifications may be made without departing from the spirit and scope of the disclosure as defined in the following claims.

What is claimed is:

1. A method of predicting vehicle clutch life based on real-time judder diagnosis, the method comprising:
    storing to a cloud server actual road driving data measured by an actual road driving information collection device while a vehicle travels;
    extracting a judder occurrence entry condition by downloading the actual road driving data from the cloud server and checking judder occurrence information in a clutch life prediction device;
    calculating a judder index by checking judder index information from the actual road driving data in the clutch life prediction device;
    predicting a clutch useful life of a double clutch transmission (DCT) using a clutch useful life prediction curve for the judder index; and
    generating a maintenance notification at a time of clutch maintenance.

2. The method of claim 1, wherein a sampling frequency equal to or higher than a specific frequency is used to measure the actual road driving data.

3. The method of claim 1, wherein the actual road driving data comprises a vehicle speed, an accelerator pedal scope range, a mileage, a transmission gear range, a clutch rotational speed, or a clutch temperature.

4. The method of claim 1, wherein extracting the judder occurrence entry condition comprises:
    checking the judder occurrence information using a vehicle speed, an accelerator pedal scope range, a transmission gear range, a clutch rotational speed, a clutch temperature, or a mileage;

applying a judder occurrence driving condition to the judder occurrence information and determining the judder occurrence driving condition as a judder occurrence condition when the judder occurrence driving condition is satisfied; and extracting a judder evaluation mode in the judder occurrence condition.

5. The method of claim 4, wherein the judder occurrence driving condition is set to a driving transmission gear range, a vehicle speed threshold, an acceleration threshold, or an accelerator pedal scope range.

6. The method of claim 1, wherein calculating the judder index comprises:

checking the judder index information using a clutch rotational speed, a clutch temperature, or a mileage;

signal-processing the clutch rotational speed through a bandpass filter and calculating the number of peaks using minimum and maximum values of the clutch rotational speed at the clutch temperature;

checking a judder index generation condition with the number of peaks; and calculating the judder index in the judder index generation condition.

7. The method of claim 6, wherein the number of peaks uses a specific number.

8. The method of claim 6, wherein:

the judder index comprises a clutch temperature index; and the clutch temperature index is set from a relationship between a clutch index of the DCT and a maximum value of longitudinal vibration of the vehicle.

9. The method of claim 1, wherein predicting the clutch useful life comprises:

averaging the judder index by setting, as a moving average, an average of a previous mileage of last measured data with respect to a mileage;

calculating the clutch useful life by data plotting of the judder index with a change in the mileage to the moving average and calculating the clutch useful life prediction curve using a curve fitting function; and checking a clutch limit life by applying a life reference point to the clutch useful life prediction curve.

10. The method of claim 9, wherein the clutch limit life is checked when the clutch useful life prediction curve deviates from the life reference point.

11. The method of claim 1, wherein generating the maintenance notification comprises:

generating a primary maintenance notification by setting, as the time of clutch maintenance, a time when the clutch useful life prediction curve deviates from a life reference point;

checking an elapse of notification time using a tolerance time; and generating a secondary maintenance notification.

12. The method of claim 11, wherein the maintenance notification uses a primary message and a secondary message to display an external message with different contents.

13. The method of claim 11, wherein the tolerance time is set in a section close to a limit life in which the clutch useful life prediction curve deviates from the life reference point.

14. A system for diagnosing vehicle judder in real time, the system comprising:

an actual road driving information collection device;

a cloud server configured to store actual road driving data measured by the actual road driving information collection device while a vehicle travels;

a clutch life prediction device configured to extract a judder evaluation mode using a vehicle speed, an acceleration, an accelerator pedal scope range, a mileage, a transmission gear range, a clutch rotational speed, or a clutch temperature of the actual road driving data, to calculate a judder index using the clutch rotational speed, the clutch temperature, or the mileage, and to predict a clutch useful life of a double clutch transmission (DCT) using a useful life prediction curve calculated by a curve fitting function after data plotting of the judder index with a change in the mileage; and a notification unit configured to generate a maintenance notification at a time of clutch maintenance checked as a result of prediction of the clutch useful life.

15. The system of claim 14, wherein the actual road driving information collection device comprises:

a transmission controller configured to detect the transmission gear range, the clutch rotational speed, or the clutch temperature in the vehicle; and a vehicle data management system (VDMS) linked to the transmission controller and the cloud server while detecting the vehicle speed, the acceleration, the accelerator pedal scope range, or the mileage in the vehicle.

16. The system of claim 14, wherein the VDMS is mounted on the vehicle.

17. The system of claim 14, wherein the clutch life prediction device comprises:

a judder evaluation condition extractor configured to download the actual road driving data from the cloud server; and a judder index calculator configured to extract the judder evaluation mode, calculate the judder index, calculate the useful life prediction curve, predict the clutch useful life, and generate the time of clutch maintenance.

* * * * *